D. BOURQUE.
FASTENER.
APPLICATION FILED JULY 11, 1916.

1,201,682.  Patented Oct. 17, 1916.

Inventor:
David Bourque,
by Emery, Booth, Janney & Varney
Attys.

UNITED STATES PATENT OFFICE.

DAVID BOURQUE, OF AMESBURY, MASSACHUSETTS, ASSIGNOR TO G. W. J. MURPHY COMPANY, OF MERRIMAC, MASSACHUSETTS, A CORPORATION OF MASSACHUSETTS.

FASTENER.

1,201,682.  Specification of Letters Patent.  Patented Oct. 17, 1916.

Application filed July 11, 1916. Serial No. 108,697.

*To all whom it may concern:*

Be it known that I, DAVID BOURQUE, a subject of the King of Great Britain, and a resident of Rocky Hill, Amesbury, county of Essex, and State of Massachusetts, have invented an Improvement in Fasteners, of which the following description, in connection with the accompanying drawings, is a specification, like characters on the drawings representing like parts.

My invention relates to fasteners of the turn-button type such as is shown, for example, in the patent to Murphy No. 853,206, and my purpose is to provide such a fastener which will be inexpensive to make and yet neat in appearance, strong in construction and reliable in its action.

Figure 1:
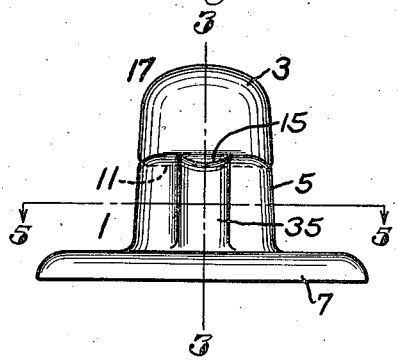
Figure 2:
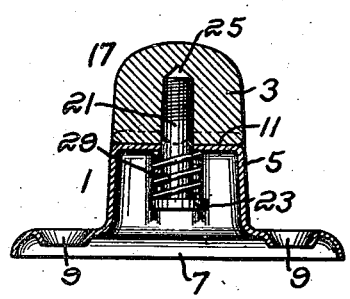
Figure 3:
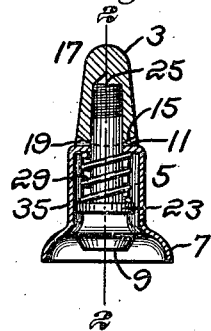
Figure 4:
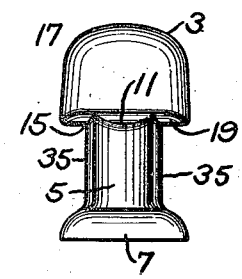
Figure 5:
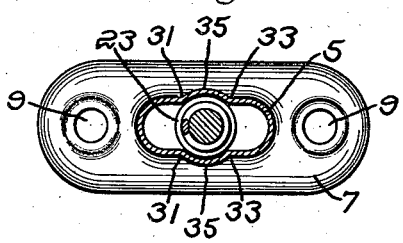
Figure 6:
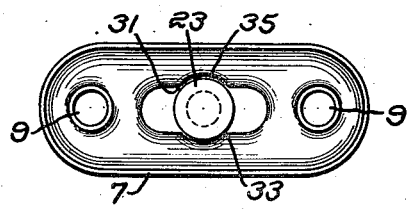

My invention will be best understood by reference to the following description taken in connection with the accompanying drawings showing one illustrative embodiment thereof, and wherein:

Figure 1 is a side elevation of the fastener; Fig. 2 is a central, longitudinal section thereof on the line 2—2 of Fig. 3; Fig. 3 is a central, transverse section on line 3—3 of Fig. 1; Fig. 4 is an end elevation of the fastener with the head or button turned to traversing position; Fig. 5 is a section on the line 5—5 of Fig. 1; and Fig. 6 is a bottom plan of the fastener.

In the embodiment of the invention here illustrated, the fastener comprises a body portion 1 and a stud portion 3 coöperating therewith. The body portion is preferably constructed from sheet metal, for example, by being died out from a plate and comprises the oblong, hollow housing 5 provided with means for securing the same in position, in the present instance a basal flange 7 provided with holes 9 for receiving suitable fastening screws. The front wall of the housing 5 is shaped to provide two grooves 11 and 15 at right angles to each other and preferably curved transversely on the arc of a circle.

The stud member 3 comprises an oblong head or button 17 having its base curved on the arc of a circle as shown at 19 and adapted to seat in one or the other of the grooves 11 and 15 as shown in Figs. 1 and 4 respectively. Secured to the head or button 17 is a shank 21 which extends through the front wall of the housing 5 at the junction of the two grooves 11 and 15 as clearly shown in Fig. 3 and which is provided with a circular head 23. This shank may be secured to the button 17 in any suitable manner, and in the present instance I have shown the end of the shank entering a recess 25 in the button and the end of the shank is formed with rugosities which may take the form of screw threads as shown. The button 17 may be clenched about such rugosities or threads and so locked in position on the shank member 21.

Surrounding the shank 21 and bearing on the inside of the front wall of the housing 5 and against the head 23 is a suitable compression spring 29 which acts to press the button against the face of the housing and lock it in position in one of the grooves 11 and 15. It will be understood that the button 17 may be seized in the fingers, turned from the position shown in Fig. 1 to that shown in Fig. 4, moving forwardly slightly against the action of the spring 29 as it is turned and in the latter case it will coöperate with a gromet or buttonhole to hold a curtain or other article in place. The sharp ridges defined between the two grooves 11 and 15 act as cam surfaces so that, if the button is not released exactly in alinement with one of the grooves, the spring will act to draw the same down such surfaces and bring it into correct position either in the groove 11 and registering with the housing 5 or in the groove 15 transversely to such housing.

The aperture in the front wall of the housing 5 provides a bearing for the shank 21 in its sliding and its rotating movement. In order to hold the stud member in proper position with respect to the base and to make its action more certain, I provide for a two-point bearing thereof by supporting and guiding the same at a point remote from such front wall. For this purpose the wall of the hollow, sheet metal housing 5 is made of such conformation as to provide a sliding and rotative bearing for the stud preferably by coöperation with the head 23 thereof. For this purpose the side walls of the housing 5 may be inbent at either side thereof as best shown at 31, 33 in Fig. 5 and at 35 formed as segments of cylindrical surfaces extending parallel with the shank 21, receiving and guiding the head 23, and embracing the same throughout opposed segments of its circumference. The housing is thus made to provide a bearing which guides the shank 21 in its sliding and in its rotary movement and it will be obvious that in coöperation with the bearing provided by the front wall of the housing 5 it maintains the stud member in perfect alinement with the base member and provides for the exact mating of the curved base 19 of the former with one of the grooves 11 and 15 of the latter.

Prior to my invention fasteners of this general type have been made in which the base members 1 were constructed of sheet metal, but in these fasteners the head 23 of the stud was free and floating in the hollow housing of the base and was supported only by the aperture in the front wall thereof. In this construction it was possible for the shank to assume a position angular to that shown in either Fig. 2 or Fig. 3, and the result was a "tinny" appearance which detracted greatly from the general effect of any structure on which the fasteners were used, just as a careless application of screws or an uneven spacing of fasteners detracts from the appearance of cabinet work. In the form of fastener here disclosed all the advantages of the stamped metal base are preserved and the cheap appearance of the completed fastener is avoided. Furthermore, because of the fact that the button or head 17 is accurately centered in proper position, the action of the fastener is made more certain and the interlocking of the two parts thereof is more secure than was the case when the head might be presented to the base at an angle so that it rested on the sides of the housing 5 instead of at the bottom thereof or even partly on the ridges between them. When the shank 2 extends obliquely through the wall of the base it may exert a leverage sidewise when turned which tends to distort the base especially by turning up a bur about the aperture which bur will support the button 17 in spaced relation from the bottom of the grooves 11 and 15 and so diminish the security of the fastening. The aperture would be further enlarged by this action and the button or head made still more loose. These disadvantages are entirely avoided by the present invention. A further advantage is the even pressure of the spring on the inside of the housing as there is less tendency for the end of the wire of the coil to bear against the wall and in turning dig into, distort and wear the thin metal.

The structure of the fastener is simple, requires the use of no extra parts, and the base may be conveniently formed by die-work from sheet material. The groove defined between the opposing, cylindrical segments 35 acts as a guide for the shank 21 when the fastener is being assembled and the parts may be much more quickly put together and, because the head 23 is guided by these grooves in coöperation with the bearing formed by the front wall of the housing, the correct placing of the button 17 with its base accurately at right angles to the axis of the shank is facilitated. Because, furthermore, of this guiding action in assembling the parts, it is impossible to make a closer fit between the shank and the housing wall and so provide a firmer bearing at that point.

I have in this specification described in considerable detail the illustrative embodiment of my invention shown in the accompanying drawings and in doing so have used specific words in referring to the various mechanical elements thereof. It will be understood, however, that I have done so with a descriptive purpose in order that the construction of the form shown might be more readily apprehended and not because all the details which are here illustrated are of the essence of the invention.

What I do claim and desire to secure by Letters Patent, is:

1. A fastener comprising in combination a sheet metal base having a hollow housing projecting therefrom, the wall of the projecting housing being bent to provide a bearing portion or portions, an oblong button or head exteriorly engaging said housing, a shank extending from said head through the front wall of the housing for rotary and axially sliding movement therein, said shank being provided with a bearing-engaging formation adapted to engage the first mentioned bearing portion or portions, and resilient means associated with said shank to retain the head in contact with said housing.

2. A fastener comprising in combination a base having a hollow housing projecting therefrom, the wall of the projecting housing being shaped to provide opposed, segmental bearing portions, an oblong button or head exteriorly engaging said housing, said head and housing having coöperating locking shoulders, a shank extending from said head through the front wall of the housing for rotary and axially sliding movement therein, said shank being provided with a circular head on its inner end adapted to engage said opposed, segmental bearing portions, and resilient means associated with said shank to retain the said oblong button or head in contact with said housing.

3. A fastener comprising in combination a base 7 having a hollow housing 5 projecting therefrom, the projecting housing being bent at 31, 33, 35 to provide a bearing portion, said housing having a transverse wall, an oblong button or head 3 exteriorly engaging said housing, a shank 21 extending from said head 3 through said transverse wall for rotary and axially sliding movement therein, said shank 21 being provided with a head 23 at its inner end portion adapted to engage said bent portion 31, 33, 35 of the housing and a spring 29 about said shank to retain the head 3 in contact with said housing.

In testimony whereof, I have signed my name to this specification.

DAVID BOURQUE.